United States Patent [19]
Kobayashi et al.

[11] Patent Number: 5,540,311
[45] Date of Patent: Jul. 30, 1996

[54] DISK BRAKE

[75] Inventors: Kinzo Kobayashi; Shinji Suzuki, both of Yamanashi-ken, Japan

[73] Assignee: Tokico Ltd., Kawasaki, Japan

[21] Appl. No.: 374,201

[22] Filed: Jan. 18, 1995

[30] Foreign Application Priority Data

Jan. 19, 1994 [JP] Japan .................................. 6-019000

[51] Int. Cl.⁶ ............................................. F16D 55/18
[52] U.S. Cl. ................................... 188/370; 188/72.4
[58] Field of Search .......................... 188/1.11 WE, 188/72.4, 73.32, 73.33, 73.39, 73.43, 73.44, 73.45, 73.47, 370; 73/121, 129, 130

[56] References Cited

U.S. PATENT DOCUMENTS 3,789,961  2/1974  Warwick ............................ 188/370
4,677,420  6/1987  Topic et al. ................... 188/1.11 WE
5,249,649  10/1993  Emmons ............................ 188/370

FOREIGN PATENT DOCUMENTS 0110552  5/1987  Japan ................................ 188/370
2231928  11/1990  United Kingdom .......... 188/1.11 WE

*Primary Examiner*—Robert J. Oberleitner
*Assistant Examiner*—Chris Schwartz
*Attorney, Agent, or Firm*—Wenderoth, Lind & Ponack

[57] ABSTRACT

One of the reference surfaces used in a process for machining a bore is formed as an integrally cast surface on the outer surface of a caliper in a location corresponding to a recess of the caliper. A flat surface which is substantially parallel with the reference surface is also integrally formed at the bottom of the recess when casting the caliper. The reference surface and the flat surface are used as contact surfaces for ultrasonic sensor probes.

4 Claims, 2 Drawing Sheets

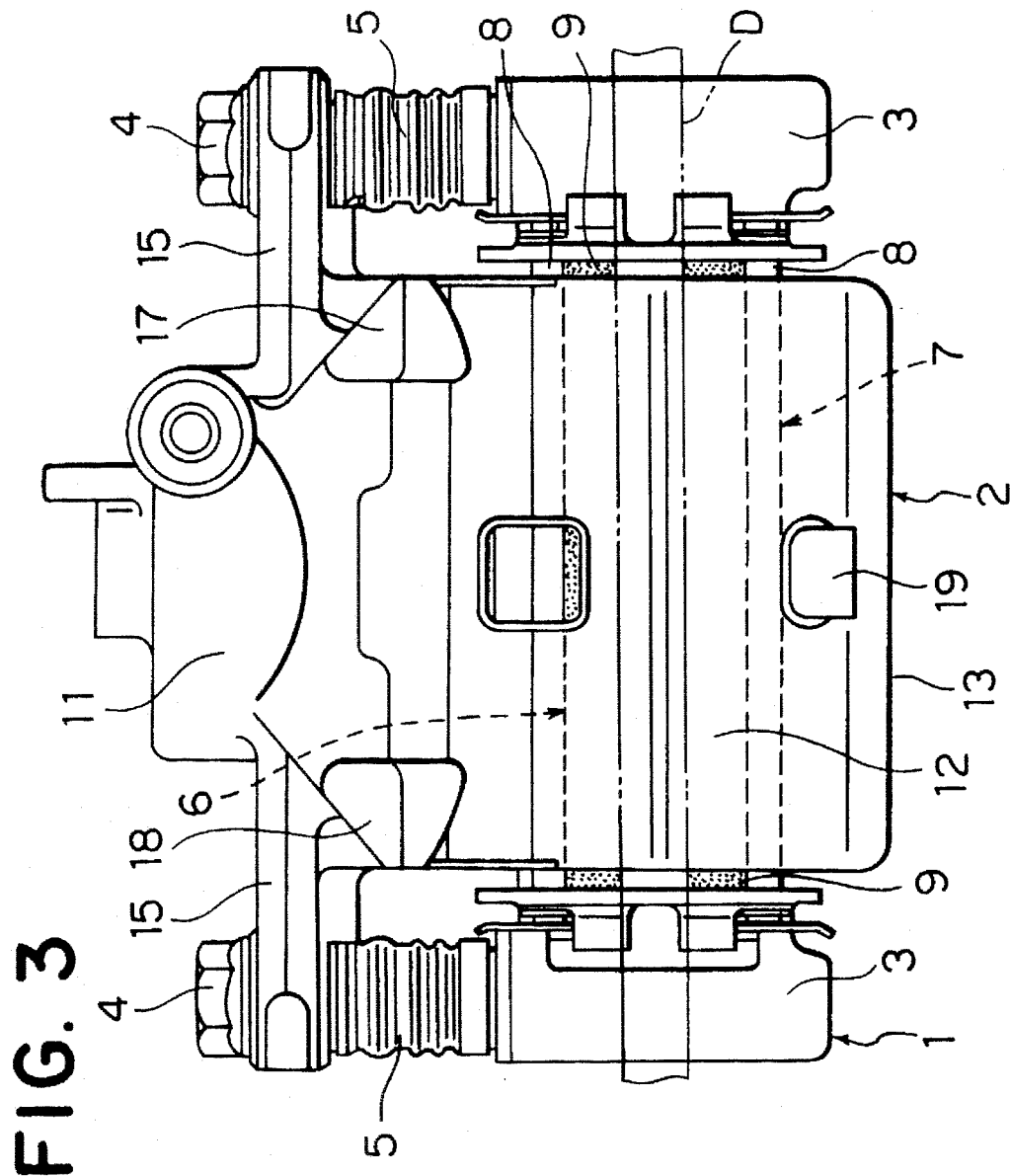

DISK BRAKE

BACKGROUND OF THE INVENTION

The present invention relates to a disk brake which is used for braking a vehicle.

There has been such a disk brake comprising a cast iron caliper consisting of a cylinder portion, a disk-pass portion extending from the cylinder portion so as to cross over a disk, and a pair of pawls which extend from the distal end of the disk-pass portion in a radially inward direction of the disk, the caliper being floatably supported by a carrier which is fixed to the non-rotating section of a vehicle, wherein a pair of pads which are supported by the carrier are pressed against the disk by the relative movement of a piston installed in the bore of the cylinder and the caliper.

In such disk brake, in general, the caliper is integrally cast by using spheroidal graphite cast iron (ductile cast iron). In this case, the ratio of graphite spheroidization and the ratio of formation into ferrite in the metal structure greatly affect the quality (strength). Therefore, the quality has been conventionally ensured by sampling one caliper for each lot or ladle of casting, and by measuring the ratio of graphite spheroidization and the ratio of formation into ferrite by measurement with ultrasonic waves. In ultrasonic wave measurement, as is well known, an ultrasonic wave is input to a sample and the structural condition is determined by the reflectance and transmittance. As a test sample, the caliper must have two substantially parallel flat surfaces (sensor contact surfaces) which serve for attaching probes for transmitting and receiving ultrasonic waves on the caliper.

On the other hand, in the caliper, the surface of various portions are curved to make the unit light. Therefore, the caliper cannot be used as it is for ultrasonic wave measurement. Conventionally, two flat surfaces were cut at appropriate locations on the caliper, for example, in the arm sections, which extend from the cylinder portion in the lateral direction and function as a mount for the caliper, and these flat surfaces were provided as sensor contact surfaces.

If it is attempted, however, to attain a necessary area (about 12 mm×12 mm) as a sensor contact surface in the above-noted way, the amount of the material to be cut away becomes significantly large. Therefore, in terms of the strength and the appearance of the caliper, the caliper has to be disposed of as scrap and, as a result, costs are increased.

In this connection, a bore to provide a cylinder portion of the caliper is machined after the casting of the caliper and a plurality of (at least three) reference planes which are later used as the placement reference for machining this bore are integrally formed on the outer surface of the caliper when casting the caliper. The present invention is to take advantage of the reference surfaces for machining the bore. The object of the present invention is to avoid the scrapping of calipers and to reduce production costs by using one of these reference surfaces as a sensor contact surface for ultrasonic wave measurement.

SUMMARY OF THE INVENTION

To achieve the object, according to the present invention, a disk brake comprises a spheroidal graphite cast iron caliper consisting of a cylinder portion, a disk-pass portion which extends so as to cross over a disk from the cylinder, and a pair of pawls which extend from the distal end of the disk-pass portion in a radially inward direction, the caliper being floatably supported by a carrier which is fixed to a non-rotating section of a vehicle, wherein a pair of pads which are supported by the carrier are pressed against a disk by the relative movement of a piston installed in the bore of the cylinder portion and the caliper. A plurality of reference surfaces used in a process for machining the bore are integrally formed by casting and a flat surface which is substantially parallel with one of the reference surfaces is formed at the bottom of the recess located between the pair of pawls.

In a disk brake which is constituted as stated above, one of the reference surfaces necessary for machining a bore is used as a sensor contact surface for ultrasonic wave measurement. It is only needed to form one flat surface which pairs with one of the reference surfaces. Therefore, even when cutting is achieved the cutting work is required for only one surface. Therefore, an amount of the material cut away is tolerable. The lowering of strength can thus be minimized. Moreover, this flat surface is provided at the bottom of the recess which permits passage of the tool for machining a bore. Therefore, the appearance of the caliper will also not be lowered.

BRIEF DESCRIPTION OF THE DRAWINGS

The above-mentioned and other objects, features, and advantages of this invention will become more apparent by the following detailed description of the invention given in conjunction with the accompanying drawings, wherein:

FIG. 3 is a plan view showing the overall structure of a disk brake according to the present invention.

DETAILED DESCRIPTION OF THE INVENTION

The embodiment of the present invention will be described with reference to the drawings.

Figure 1:
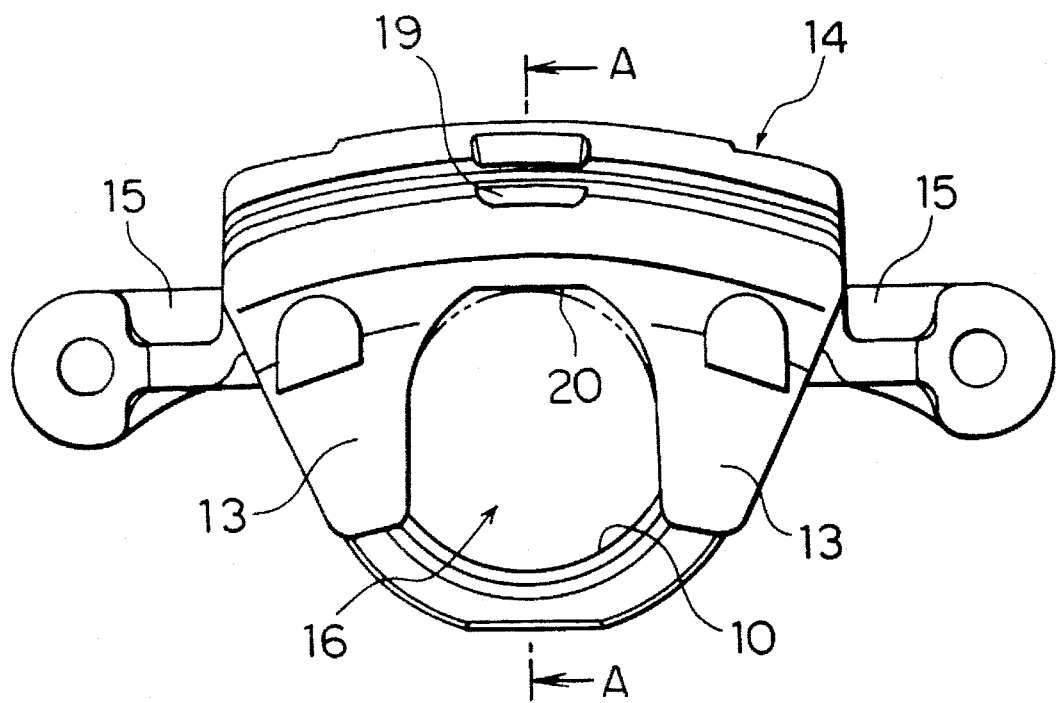
FIG. 1 is a front view showing the structure of a caliper constituting a disk brake according to the present invention.
Figure 2:
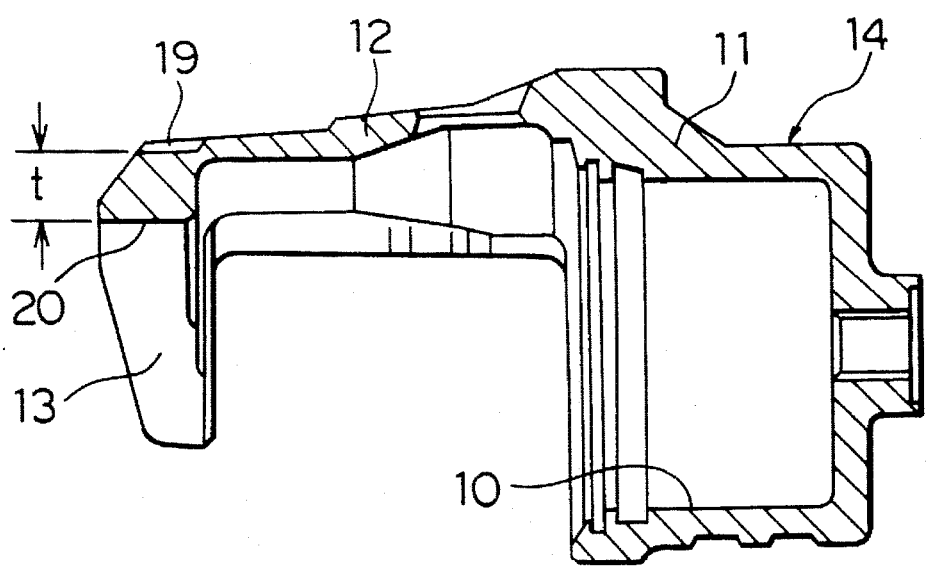
FIG. 2 is a sectional view along the line designated by arrows A—A in FIG. 1.

In FIGS. 1 to 3, numeral 1 is a carrier which is fixed to a non-rotating portion of a vehicle, numeral 2 is a caliper which is slidably supported by a pair of supports 3 on the upper portion of the carrier 1 using pins 4 and 4. Each pin 4 is covered with a dust boot 5. The supports 3 of the carrier 1 extend to cross over a disk D, and a pair of friction pads 6 and 7 which are located on both sides of the disk D are slidably supported by the supports 3. Each of the friction pads 6 and 7 consists of a back board 8 and a lining material 9 which is bonded to the surface of the back board 8 so that it faces the disk, D.

Furthermore, the caliper 2 comprises a caliper body 14 consisting of a cylinder portion 11 having a bore 10 which houses a piston (not shown), a disk-pass portion 12 which extends so as to cross over a disk D from the cylinder portion 11, and a pair of pawls 13 which extend from the distal end of the disk-pass portion 12 in a radially inward direction of the disk D. A pair of arms 15 are formed to laterally extend from the cylinder portion 11, and the caliper 2 is attached to the carrier 1 through the arms.

In such a disk brake, on one hand, when pressurized oil is supplied to the bore 10 of the caliper 2, a piston (not shown) is extended and a friction pad 6 located on the inside of the vehicle is pressed against one side of the disk D. On the other hand, in reaction to this pressing, the caliper 14 moves relative to the piston. The friction pad 7 located on the outside of the disk is pressed against the other side of the disk D by the pawls 13 of the caliper body 14, thereby generating a braking force.

The caliper body 14 is formed in an integral unit using a ductile cast iron by casting. The bore 10 is machined after the casting of the caliper body 14. When this bore 10 is machined, the caliper body 14 is placed facing upward on the table of a machine tool, that is, the axis of the bore 10 is horizontal and the free ends of the pawls 13 are set to face upward. A tool (not shown) is inserted in the bore 10 through the recess 16 between the pawls 13, and the inner surface of the bore 10 is machined up to a predetermined depth by the rotation of the tool. In this case, it is necessary to accurately center the bore 10 and the tool. For this purpose, three reference surfaces 17, 18, and 19 for machining the bore are integrally formed on the outer surface of the caliper body 14 when casting the caliper body 14. In the embodiment, among the reference surfaces, two reference surfaces 17 and 18 are formed on the cylinder portion 11 at a predetermined spacing in the circumferential direction of the disk D. The remaining reference surface 19 is formed at a place corresponding to the recess 16. Therefore, the caliper body 14 is placed on the table of a machine tool and supported at three points and then the cutting process is performed. Moreover, each of these reference surfaces 17 to 19 has an area sufficiently greater than the area [12 mm×12 mm] required for a sensor contact surface for the measurement through ultrasonic waves.

On the other hand, in the caliper body 14, a flat surface 20 which is approximately parallel to the reference surface 19 is formed on the bottom of the recess 16. This flat surface 20 is integrally formed when casting the caliper body 14 and has an area slightly greater than the area [12 mm×12 mm] required for a sensor contact surface for the measurement through ultrasonic waves.

In a disk brake which is constituted as stated above, for the measurement of the ratio of graphite spheroidization and the ratio of formation into ferrite of the caliper body 14, one caliper is sampled for one lot of casting, that is, for each ladle. One (19) of the reference surfaces which are required for machining a bore 10 and a flat surface 20 which is formed on the bottom of the recess 16 are selected as sensor contact surfaces, and probes for the measurement through ultrasonic waves are brought into contact with these two surfaces 19 and 20 to achieve ultrasonic wave measurement. In this case, the flat surface 20 constitutes the bottom of the recess 16 which is formed in order to permit the tool for machining the bore to pass. Therefore, the quality and the appearance of the caliper body are not lowered. The caliper body 14 which is used for the measurement through ultrasonic waves can be used as a commercial product as it is. Moreover, since the two surfaces 19 and 20 as sensor contact surfaces are located closely and oppositely with each other, the measurement sensitivity using ultrasonic waves is increased and the measurement accuracy is improved. Furthermore, since the flat surface 20 on the bottom of the recess 16 is formed integrally on the caliper body when casting the caliper body 14, further processing becomes unnecessary. This is extremely advantageous in terms of cost.

This embodiment uses the caliper body 14 in which a reference surface 19 is provided at a place corresponding to the recess 16. However, the invention is not limited to use of the specific place in which a reference surface for machining the bore is provided. A caliper body in which a reference surface is not aligned with the recess 16 can also be used. Moreover, in the embodiment, it is arranged so that the flat surface 20 which is provided on the bottom of the recess 16 is integrally formed when casting the caliper body 14. However, this flat surface 20 can also be formed by cutting after the casting of the caliper body 14 or can be formed by padding. When the flat surface 20 is formed by cutting, the amount of cutting becomes minimal because only one side is required to be cut, thereby minimizing lowering of strength. Moreover, when the flat surface 20 is formed by padding, it will contribute to improvement of strength.

In any case, it is desirable that a flat surface 20 be provided so that it tangentially contacts with a circle (shown by the chain line in FIG. 1) which defines a minimum space enabling the rotation of a tool so as to leave a sufficient thickness (shown by "t" in FIG. 2) at the bottom of the pawl section.

As stated above in detail, according to the present invention, in a disk brake, one of the reference surfaces which are required for machining a bore is used as a sensor contact surface for the measurement through ultrasonic waves and a flat surface which should be paired with the reference surface is formed on the bottom of the recess which is formed to permit passage of the tool for machining a bore. Therefore, not only the lowering of the strength of the caliper can be minimized, but also deterioration of the appearance can be avoided. The caliper which is used for the measurement through ultrasonic waves can therefore be used as a commercial product as it is, thereby contributing considerably to the reduction in production costs. Moreover, if one of the reference surfaces is provided in a place corresponding to the bottom of the recess, the two sensor contact surfaces are located close to each other in an opposing relationship, thereby increasing the measurement sensitivity and improving the measurement accuracy. Furthermore, the flat surface provided at the bottom of the recess can be used as a surface which engages a device for handling a caliper when the caliper is later assembled into a brake, thereby improving the assembly work.

What is claimed is:

1. A disk brake comprising a caliper including:

a cylinder portion having a cylindrical bore formed therein;

a disk-pass portion extending in a substantially axial direction from said cylinder portion, said disk-pass portion having a distal end remote from said cylinder portion;

a pair of pawls extending from said distal end of said disk-pass portion and in a substantially radial direction of said cylinder portion, said pawls being spaced apart from one another substantially across a center line of said cylindrical portion such that a recess is formed between said pawls with a recess bottom being defined between adjacent base ends of said respective pawls;

wherein a plurality of flat reference surfaces are integrally cast on said caliper for use in engaging a support of a machining tool to position said caliper relative to said machining tool for machining of said cylindrical bore;

wherein a flat sensor contact surface is formed on said recess bottom and faces in a substantially radially inward direction;

wherein one of said flat reference surfaces is formed on a radially outer side of said distal end of said disk-pass portion and faces in a substantially radially outward direction; and wherein said flat sensor contact surface and said one of said flat reference surfaces are substantially parallel to one another and are at least partly superposed.

2. A disk brake as recited in claim 1, wherein said caliper is formed of spheroidal graphite cast iron.

3. A caliper for use in a disk brake, the disk brake having a disk which rotates with a wheel of a vehicle and a carrier which is attached to a vehicle body, said caliper comprising:
- a support portion for being supported by said carrier such that said caliper can be moved in an axial direction of the disk;
- a cylinder portion mounted to said support portion and having a cylindrical bore formed therein;
- a disk-pass portion extending in a substantially axial direction from said cylinder portion, said disk-pass portion having a distal end remote from said cylinder portion;
- a pair of pawls extending from said distal end of said disk-pass portion and in a substantially radial direction of said cylinder portion, said pawls being spaced apart from one another substantially across a center line of said cylindrical portion such that a recess is formed between said pawls with a recess bottom being defined between adjacent base ends of said respective pawls;
- wherein a plurality of flat reference surfaces are integrally cast on said caliper for use in engaging a support of a machining tool to position said caliper relative to said machining tool for machining of said cylindrical bore;
- wherein a flat sensor contact surface is formed on said recess bottom and faces in a substantially radially inward direction;
- wherein one of said flat reference surfaces is formed on a radially outer side of said distal end of said disk-pass portion and faces in a substantially radially outward direction; and
- wherein said flat sensor contact surface and said one of said flat reference surfaces are substantially parallel to one another and are at least partly superposed.

4. A caliper as recited in claim 3, wherein said caliper is formed of spheroidal graphite cast iron.

* * * * *